(12) United States Patent
Dai et al.

(10) Patent No.: US 8,787,860 B2
(45) Date of Patent: Jul. 22, 2014

(54) IMAGE CANCELLATION IN RECEIVERS USING DUAL ADAPTIVE FILTERS

(75) Inventors: Shaoan Dai, San Jose, CA (US); Runsheng He, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 27 days.

(21) Appl. No.: 13/549,376

(22) Filed: Jul. 13, 2012

(65) Prior Publication Data
US 2013/0023226 A1 Jan. 24, 2013

Related U.S. Application Data

(60) Provisional application No. 61/510,274, filed on Jul. 21, 2011.

(51) Int. Cl.
*H04B 1/10* (2006.01)
(52) U.S. Cl.
USPC .............................. 455/296; 455/285; 455/302
(58) Field of Classification Search
USPC .......................... 455/283–286, 296, 302–306
See application file for complete search history.

(56) References Cited

U.S. PATENT DOCUMENTS

| 5,564,097 | A | 10/1996 | Swanke |
| 5,612,971 | A | 3/1997 | Dormer |
| 5,826,180 | A | 10/1998 | Golan |
| 6,516,186 | B1 | 2/2003 | Yamagishi et al. |
| 6,714,776 | B1 | 3/2004 | Birleson |
| 6,760,577 | B2 * | 7/2004 | Li .................................. 455/323 |
| 6,876,842 | B2 | 4/2005 | Davie |
| 6,917,815 | B2 | 7/2005 | Hajimiri et al. |
| 6,980,787 | B1 | 12/2005 | Dujmenovic |
| 6,987,815 | B2 * | 1/2006 | Denno .......................... 375/316 |
| 7,042,927 | B2 | 5/2006 | Wight |
| 7,130,359 | B2 * | 10/2006 | Rahman ........................ 375/316 |
| 7,142,835 | B2 | 11/2006 | Paulus |
| 7,146,146 | B2 | 12/2006 | Masenten et al. |
| 7,151,917 | B2 | 12/2006 | Paulus |
| 7,174,146 | B2 | 2/2007 | Wu et al. |
| 7,203,473 | B2 * | 4/2007 | Kishi ............................ 455/305 |
| 7,292,836 | B2 | 11/2007 | Endress et al. |
| 7,346,324 | B2 | 3/2008 | Sakurai |
| 7,609,772 | B2 * | 10/2009 | Yu et al. ........................ 375/316 |

(Continued)

OTHER PUBLICATIONS

Asad A. Abidi; "Direct-Conversion Radio Transceivers for Digital Communications"; IEEE Journal of Solid-State Circuits, vol. 30, No. 12; pp. 1399-1410; Dec. 1995.

(Continued)

*Primary Examiner* — Simon Nguyen

(57) ABSTRACT

The present disclosure includes apparatus, systems, and techniques relating to receiver image cancellation. A described technique includes receiving a downconverted signal in a digital domain, the downconverted signal including an in-phase signal and a quadrature signal; generating a first signal of a signal channel based on the downconverted signal; generating a second signal of an image channel based on the downconverted signal; filtering the second signal using first weights to produce a pilot training signal; filtering the second signal using second weights to produce an image cancellation signal; generating an output signal by subtracting the image cancellation signal from the first signal to resolve the desired signal; updating the first weights based on the first weights, the second signal, the pilot training signal, and a pilot signal; and updating the second weights based on the second weights, the output signal, and the pilot training signal.

22 Claims, 5 Drawing Sheets

(56) References Cited

U.S. PATENT DOCUMENTS

| | | | |
|---|---|---|---|
| 7,684,778 | B1 | 3/2010 | Qian et al. |
| 7,783,273 | B2 * | 8/2010 | Maeda et al. ............... 455/285 |
| 7,873,342 | B2 * | 1/2011 | Lim et al. ................... 455/285 |
| 8,023,920 | B1 * | 9/2011 | Qian et al. .................. 455/302 |
| 8,208,530 | B2 * | 6/2012 | Tan et al. .................... 375/235 |
| 2002/0177425 | A1 | 11/2002 | Li |
| 2002/0183033 | A1 * | 12/2002 | Gu et al. ..................... 455/302 |
| 2002/0197972 | A1 | 12/2002 | Wong et al. |
| 2003/0125005 | A1 | 7/2003 | Lee |
| 2003/0181187 | A1 | 9/2003 | Liu |
| 2004/0002318 | A1 * | 1/2004 | Kerth et al. ................. 455/302 |
| 2004/0185815 | A1 | 9/2004 | Fukuda et al. |
| 2004/0198299 | A1 | 10/2004 | Gardenfors et al. |
| 2005/0096002 | A1 | 5/2005 | Klinke et al. |
| 2006/0030287 | A1 | 2/2006 | Vanderhelm et al. |
| 2006/0111071 | A1 | 5/2006 | Paulus et al. |
| 2006/0252399 | A1 | 11/2006 | Paulus |

OTHER PUBLICATIONS

Behbahani et al.; "CMOS Mixers and Polyphase Filters for Large Image Rejection"; IEEE Journal of Solid-State Circuits, vol. 36, No. 6; pp. 873-887; Jun. 2001.

Behzad Razavi; "A 5.2-GHz CMOS Receiver with 62-dB Image Rejection"; IEEE Journal of Solid-State Circuits, vol. 36, No. 5; pp. 810-815; May 2001.

Crols et al.; "A Single-Chip 900 MHz CMOS Receiver Front-End with a High Performance Low-IF Topology"; IEEE Journal of Solid-State Circuits, vol. 30, No. 12; pp. 1483-1492; Dec. 1995.

Dawkins et al.; "A Single-Chip tuner for DVB-T"; IEEE Journal of Solid-State Circuits, vol. 38, No. 8; pp. 1307-1317; Aug. 2003.

Der et al.; "A 2-GHz CMOS Image-Reject Receiver with LMS Calibration"; IEEE Journal of Solid-State Circuits, vol. 38, No. 2; pp. 167-175; Feb. 2003.

Jack P.F. Glas; "Digital I/Q Imbalance Compensation in a Low-IF Receiver"; Nov. 1998, Bell Labs, Lucent Technologies; JPFGlas@lucent.com.

Rudell et al.; "A 1.9-GHz Wide-Band IF Double Conversion CMOS Receiver for Cordless Telephone Applications"; IEEE Journal of Solid-State Circuits, vol. 32, No. 12; pp. 2071-2088; Dec. 1997.

Valkama et al.; "Advanced Methods for I/Q Imbalance Compensation in Communication Receivers"; IEEE Transactions on Signal Processing, vol. 49, No. 10; pp. 2335-2344; Oct. 2001.

Van Gerven; "Signal Separation by Symmetric Adaptive Decorrelation: Stability, Convergence, and Uniqueness"; IEEE Transactions on Signal Processing, vol. 43, No. 7; pp. 1602-1612; Jul. 1995.

Van Sinderen et al.; "A 48-860MHz Digital Cable Tuner IC with Integrated RF and IF Selectivity"; ISSCC 2003/Session25/RF Infotainment/Paper 25.3.

Yu et al.; "A Novel Adaptive Mismatch Cancellation System for Quadrature IF Radio Receivers": IEEE Transactions on Circuits and Systems-II: Analog and Digital Signal Processing, vol. 46, No. 6; pp. 789-801; Jun. 1999.

* cited by examiner

IMAGE CANCELLATION IN RECEIVERS USING DUAL ADAPTIVE FILTERS

CROSS REFERENCE TO RELATED APPLICATIONS

The present disclosure claims the benefit of the priority of U.S. Provisional Application Ser. No. 61/510,274, filed Jul. 21, 2011 and entitled "Low IF Image DSP Cancellation." This document is related to U.S. patent application Ser. No. 12/718,909, filed Mar. 5, 2010 and entitled "Image cancellation in receivers," which is a continuation of U.S. Pat. No. 7,684,778, entitled "Image cancellation in receivers." The disclosure of these above-identified patent and applications are incorporated herein by reference in their entirety.

FIELD OF USE

The present disclosure relates to image cancellation in receivers.

BACKGROUND

Reception of a low-level radio-frequency (RF) signal often benefits from low noise and high precision operation. Noise and imprecision in such circuits have many different origins. Interference from another frequency band is a factor that can limit system performance. One common undesired interference signal is an image frequency that is symmetrical to a signal frequency relative to a local oscillator frequency of a downconverter. Interference caused by the image frequency is referred to as image frequency interference. Image frequency interference can produce undesirable content in the eventual received signal.

SUMMARY

The present disclosure includes systems, apparatuses, and techniques for image cancellation in receivers using dual adaptive filters. In one aspect, a described apparatus includes circuitry configured to receive a downconverted signal in a digital domain, the downconverted signal include an in-phase signal and a quadrature signal; and circuitry configured to perform operations in the digital domain. The operations include generating a first signal of a signal channel based on the downconverted signal, generating a second signal of an image channel based on the downconverted signal, filtering the second signal using first weights to produce a pilot training signal, filtering the second signal using second weights to produce an image cancellation signal, generating an output signal by subtracting the image cancellation signal from the first signal to resolve the desired signal, updating the first weights based on the first weights, the second signal, the pilot training signal, and a pilot signal, and updating the second weights based on the second weights, the output signal, and the pilot training signal.

These and other implementations can include one or more of the following features. The downconverted signal can be responsive to a quadrature downconversion of a combined signal in an analog hardware section. The combined signal can be based on a communications signal and a version of the pilot signal. The operations can include generating the pilot signal. Updating the first weights can include using a least-mean-squares technique to iteratively adapt the first weights such that the pilot training signal replicates a version of the pilot signal that is responsive to an IQ imbalance of the analog hardware section. Updating the second weights can include using a least-mean-squares technique to iteratively adapt the second weights such that the image cancellation signal is responsive to the pilot training signal and the signal leakage between the signal channel and the image channel as caused by the IQ imbalance. Filtering the second signal using the first weights can include providing a version of the first weights to a multi-tap finite impulse response filter. Filtering the second signal using the second weights can include providing a version of the second weights to a multi-tap finite impulse response filter. Generating the pilot signal can include using a random signal to produce the pilot signal. A communications signal can include one or more digital television signals. Implementations can include an upconverter to generate the version of the pilot signal by upconverting an analog version of the pilot signal into a frequency band of the desired signal.

A described system includes a radio frequency interface configured to receive a communications signal including a desired signal; a combiner configured to add the communications signal and a version of a pilot signal to produce a combined signal; an analog hardware section configured to perform a quadrature downconversion on the combined signal to produce a downconverted signal in a digital domain, the downconverted signal including an in-phase signal and a quadrature signal; a memory structure configured to store data including first weights and second weights; and a processor, communicatively coupled with the combiner, the analog hardware section, and the memory structure. The processor can be configured to perform operations including generating the pilot signal, generating a first signal of a signal channel based on the downconverted signal, generating a second signal of an image channel based on the downconverted signal, filtering the second signal using the first weights to produce a pilot training signal, filtering the second signal using the second weights to produce an image cancellation signal, generating an output signal by subtracting the image cancellation signal from the first signal to resolve the desired signal, updating the first weights based on the first weights, the second signal, the pilot training signal, and the pilot signal, and updating the second weights based on the second weights, the output signal, and the pilot training signal.

A described technique includes receiving a downconverted signal in a digital domain, the downconverted signal including an in-phase signal and a quadrature signal; generating a first signal of a signal channel based on the downconverted signal; generating a second signal of an image channel based on the downconverted signal; filtering the second signal using first weights to produce a pilot training signal; filtering the second signal using second weights to produce an image cancellation signal; generating an output signal by subtracting the image cancellation signal from the first signal to resolve the desired signal; updating the first weights based on the first weights, the second signal, the pilot training signal, and a pilot signal; and updating the second weights based on the second weights, the output signal, and the pilot training signal.

Particular embodiments of the technology described in this document can be implemented so as to realize one or more of the following advantages. Digital signal processing image cancellation technologies move image cancellation from analog to digital domain, which can make image cancellation robust in the variations of process, voltage, and temperature within a wireless receiver system. Broadband image cancellation that compensates for image leakage caused by component mismatches between different IQ channels in an analog hardware section of a receiver can be targeted. Image cancellation capabilities provided by a digital signal processor (DSP) can reduce a component matching requirement for an analog hardware section. Moreover, systems and apparatuses with guaranteed convergence to the optimum cancellation solution and numerical stability can be realized. One or more described technologies need not require frequency response shaping to a signal channel output.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1:
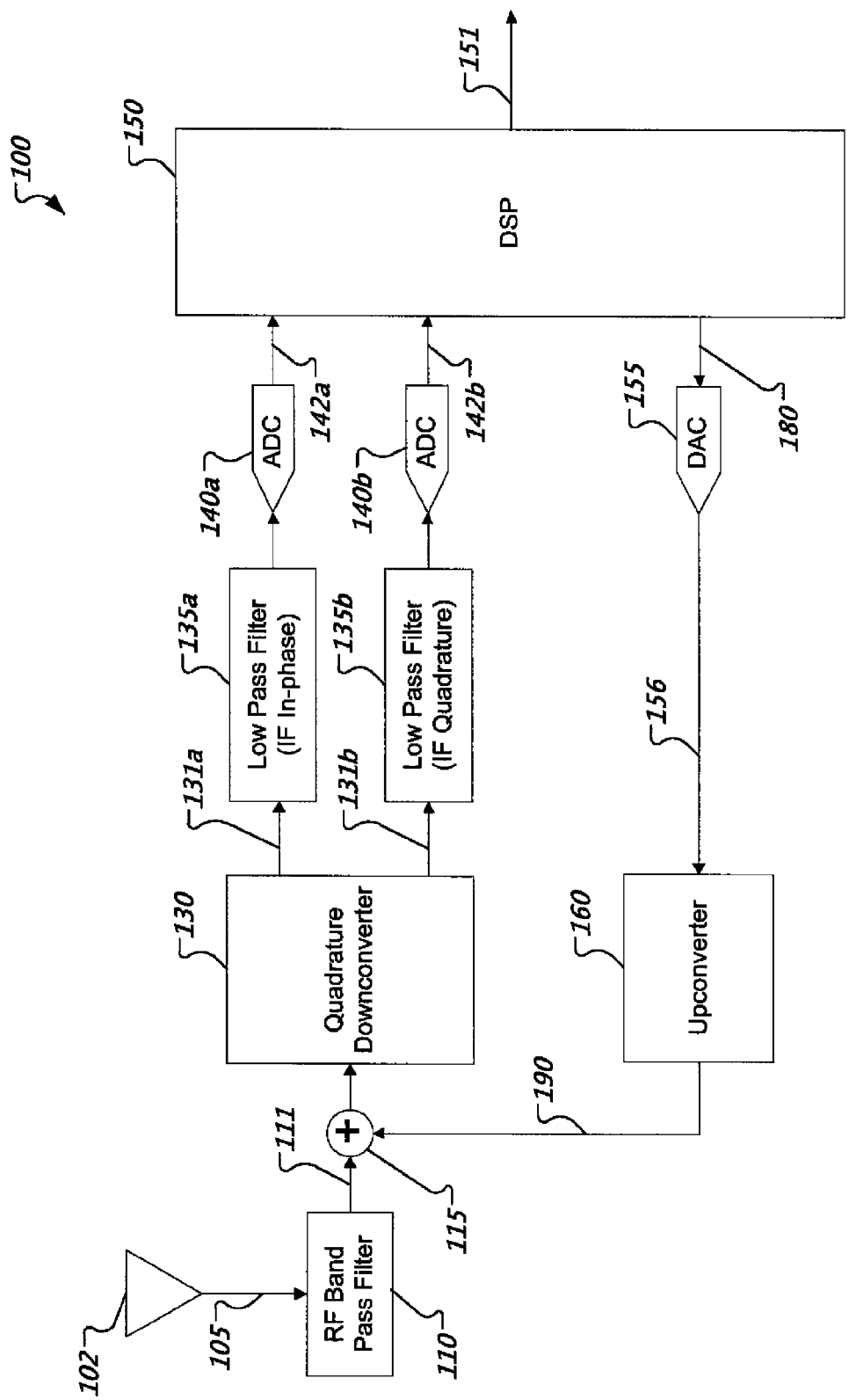
FIG. 1 shows an example of a wireless receiver system configured to perform image cancellation.

FIG. 1 shows an example of a wireless receiver system 100 configured to perform image cancellation. The wireless receiver system 100 includes an antenna 102, a RF band pass filter 110, a combiner such as an adder 115, a quadrature downconverter 130, low pass filters (LPFs) 135a-b, analog-to-digital convertors (ADCs) 140a-b, a processor such as a DSP 150, a digital-to-analog convertor (DAC) 155, and an upconverter 160. An RF input signal 105 is received from one or more antennas 102 and passes through the RF band pass filter 110. The RF input signal 105 can include one or more signals at one or more frequency bands. The RF band pass filter 110 can eliminate signal contributions from outside of a predetermined frequency band to create a filtered RF input signal 111. An adder 115 combines the filtered RF input signal 111 with a broadband pilot signal 190.

The DSP 150 generates a digital pilot signal 180 for injection into the filtered RF input signal 111. The digital pilot signal 180 can be based on a digital random sequence such as a pseudonoise sequence or a binary phase-shift keying (BPSK) modulated M-sequence. The digital-to-analog converter (DAC) 155 converts the digital pilot signal 180 into an analog pilot signal 156. The upconverter 160 generates the broadband pilot signal 190 by upconverting the analog pilot signal 156 into the broadband pilot signal 190. In some implementations, this upconversion can be performed by the DSP 150.

To produce a combined signal, the adder inserts the broadband pilot signal 190 into the filtered RF input signal 111. The combined signal passes through a quadrature downconverter 130 which produces an in-phase signal 131a and a quadrature-phase signal 131b at an intermediate frequency (IF). A first LPF 135a filters the in-phase signal 131a, while a second LPF 135b filters the quadrature-phase signal 131b. These LPFs 135a-b remove signal contributions from frequencies at or above a predetermined threshold, while allowing signal contributions from frequencies below the predetermined threshold. A first ADC 140a provides a digital version 142a of a filtered in-phase signal to the DSP 150. A second ADC 140b provides a digital version 142b of a filtered quadrature-phase signal to the DSP 150.

The in-phase and quadrature signals 131a-b include a desired band signal and an image band signal. Due to an IQ imbalance of in-phase channel and quadrature channel signal pathways, interference from the image band signal can leak into the desired band signal and degrade the signal to noise ratio (SNR) of the wireless receiver system 100. Hence, the DSP 150 is configured to perform one or more image cancellation routines that compensate for this IQ imbalance. In the receiver image cancellation, the DSP 150 tracks the IQ imbalance by using the broadband pilot signal 190 and outputs a signal 151.

The DSP 150, in some implementations, is configured to perform operations by a controller (not shown) that causes the DSP 150 to execute instructions stored in a memory structure (not shown) such as a flash memory or a read-only memory. The operations, for example, can perform an intermediate frequency image cancellation digital signal processing technique. The DSP 150 can be configured to perform filtering via two adaptive finite impulse response (FIR) filter systems. The adaptive FIR systems include a filter system for image-to-signal channel and rotor estimation and a filter system for image interference cancellation signal estimation. The "rotor" term can refer to a one tap complex filter, which includes one tap for in-phase and one tap for quadrature. When a one complex tap varies, it looks like a rotor rotating on the complex plain. The two adaptive FIR systems can include at least one multi-tap FIR filter for each adaptive FIR system. In some implementations, the DSP 150 accesses one or more memory structures (not shown) that store weight values for the adaptive multi-tap FIR filtering systems.

Figure 2:
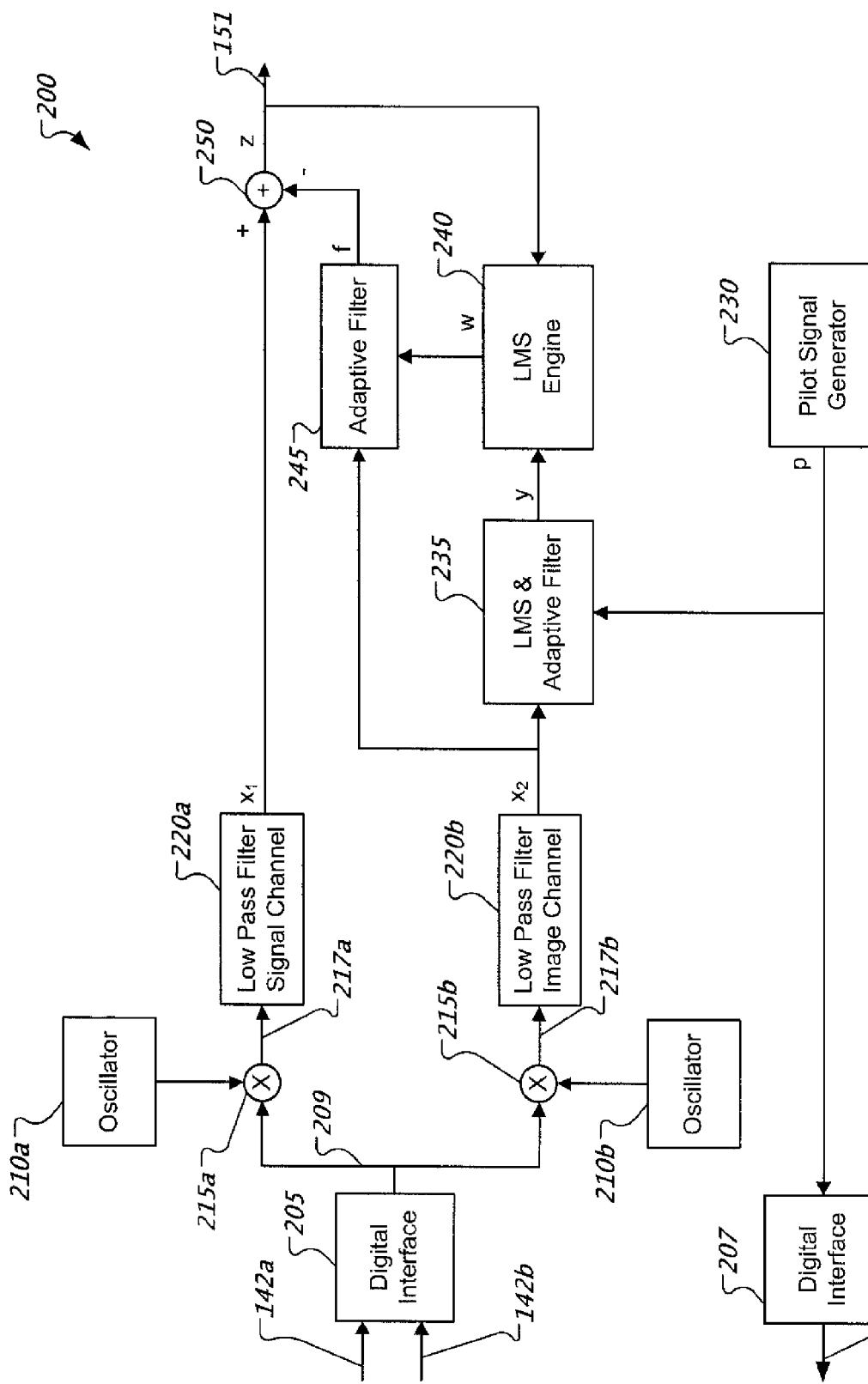
FIG. 2 shows an example of a digital signal processing system embodied by the DSP of FIG. 1.

FIG. 2 shows an example of a digital signal processing system 200 embodied by the DSP 150 of FIG. 1. The digital signal processing system 200 includes digital interfaces 205, 207, oscillators 210a-b, multipliers 215a-b, low pass filters 220a-b, pilot signal generator 230, Least Mean Squares (LMS) engine 240, adaptive filter 245, LMS & adaptive filter (LMS-AF) 235, and adder 250. The digital signal processing system 200 can include a processor such as a DSP 150, specialized digital logic, or both that is configured to perform functions depicted by FIG. 2. In some implementations, the digital interfaces 205, 207 include one or more pin connections on a DSP chip.

The digital interface 205 receives inputs that collectively can be referred to as a downconverted low IF complex signal, the inputs include the digital version 142a of the filtered in-phase signal from the first ADC 140a of FIG. 1 and the digital version 142b of the filtered quadrature-phase signal from the second ADC 140b of FIG. 1. The digital interface 205 provides a digital complex signal 209 to the multipliers 215a-b for downconversion into baseband. Outputs of the multipliers 215a-b include respective complex baseband signals 217a-b that each include an in-phase part and a quadrature part.

A first oscillator 210a provides a first modulation signal of a form $\exp(j2\pi ft)$ to the first multiplier 215a. The first multiplier 215a multiplies the complex signal 209 with the first modulation signal to produce a first baseband signal 217a. A second oscillator 210b provides a second modulation signal of a form $\exp(-j2\pi ft)$ to the second multiplier 215b. The second multiplier 215b multiplies the complex signal 209 with the second modulation signal to produce a second baseband signal 217b. Other types of modulation signals can be used. In some implementations, the first and second oscillators 210a-b form an integrated oscillator block. In some implementations, the signals need not be downconverted at all. Thus, the below-described filter adaptation and signal processing can also be implemented in IF band instead of baseband. The discussion below, however, focuses on the baseband point of view.

The baseband signals 217a-b are filtered through respective low pass filters 220a-b to remove high frequency components such as any copies of the baseband signal at twice the IF, which was generated by the digital downconversion process at the multipliers 215a-b. In some implementations, the low pass filters 220a-b include FIR filters. In some implementations, the low pass filters 220a-b include infinite impulse response (IIR) filters. In some implementations, the bandwidths of the low pass filters 220a-b are the same as a TV channel bandwidth, e.g., 6 MHz for an Advanced Television Systems Committee (ATSC) TV standard.

In producing the z output signal 151, the adder 250 performs in accordance with a following equation:

$$z[n]=x_1[n]-f[n]$$

which additively combines an $x_1$ output of the signal channel LPF 220a with a negative version of an output signal f from the adaptive filter 245. The adaptive filter 245 is configured to generate the output signal f using signals, either directly or indirectly, from the image channel LPF 220b, LMS-AF 235, LMS engine 240, and the pilot signal generator 230.

The pilot signal generator 230 generates a pilot signal p for the upconversion and injection (not shown) into filtered RF input signal 111 of FIG. 1 via the digital interface 207. In addition, the pilot signal generator 230 provides the pilot signal p to the LMS-AF 235. The pilot signal p can be expressed as a vector of pilot signal values. The pilot signal p is received by the digital interface 207 to provide the pilot signal 180 of the DAC 155 of FIG. 1.

The LMS-AF 235 produces a pilot training signal y based on a weight vector γ and the pilot signal p. In this example, LMS-AF 235 produces a pilot training signal in accordance with a following equation:

$$y[n]=\vec{\gamma}_{n-1}^H \cdot \vec{p}[n]$$

where n represents an index value. The LMS-AF 235 can update its weights in accordance with:

$$\vec{\gamma}_n=\vec{\gamma}_{n-1}+\mu_1(\vec{x}_2[n]-\vec{y}[n])^H \vec{p}[n]$$

where an image channel signal $x_2$ is received from the image channel LPF 220b and $\mu_1$ represents a weight adjustment parameter. In some implementations, LMS-AF 235 includes an adaptive multi-tap FIR filter with tap number, L, and $\vec{\gamma}_n$, includes L weight values for the adaptive multi-tap FIR filter at the n-th index. In some implementations, $\vec{p}[n]$ is a vector that includes L samples of the pilot signal.

The LMS engine 240 produces a weight vector w for the adaptive filter 245 in accordance with an equation:

$$\vec{w}_n=\vec{w}_{n-1}+\mu_2 z[n]^* \vec{y}_{n-1}$$

where $\mu_2$ represents a weight adjustment parameter. The adaptive filter 245 computes a signal f in accordance with an equation:

$$f[n]=\vec{w}_{n-1}^H \vec{x}^*_2[n]$$

where a weight vector w is received from the LMS engine 240 and the image channel signal $x_2$ is received from the image channel LPF 220b. In some implementations, the adaptive filter 245 includes an adaptive multi-tap FIR filter with tap number, K, and $\vec{w}_n$ includes K weight values for the adaptive multi-tap FIR filter at the n-th index.

Figure 3:
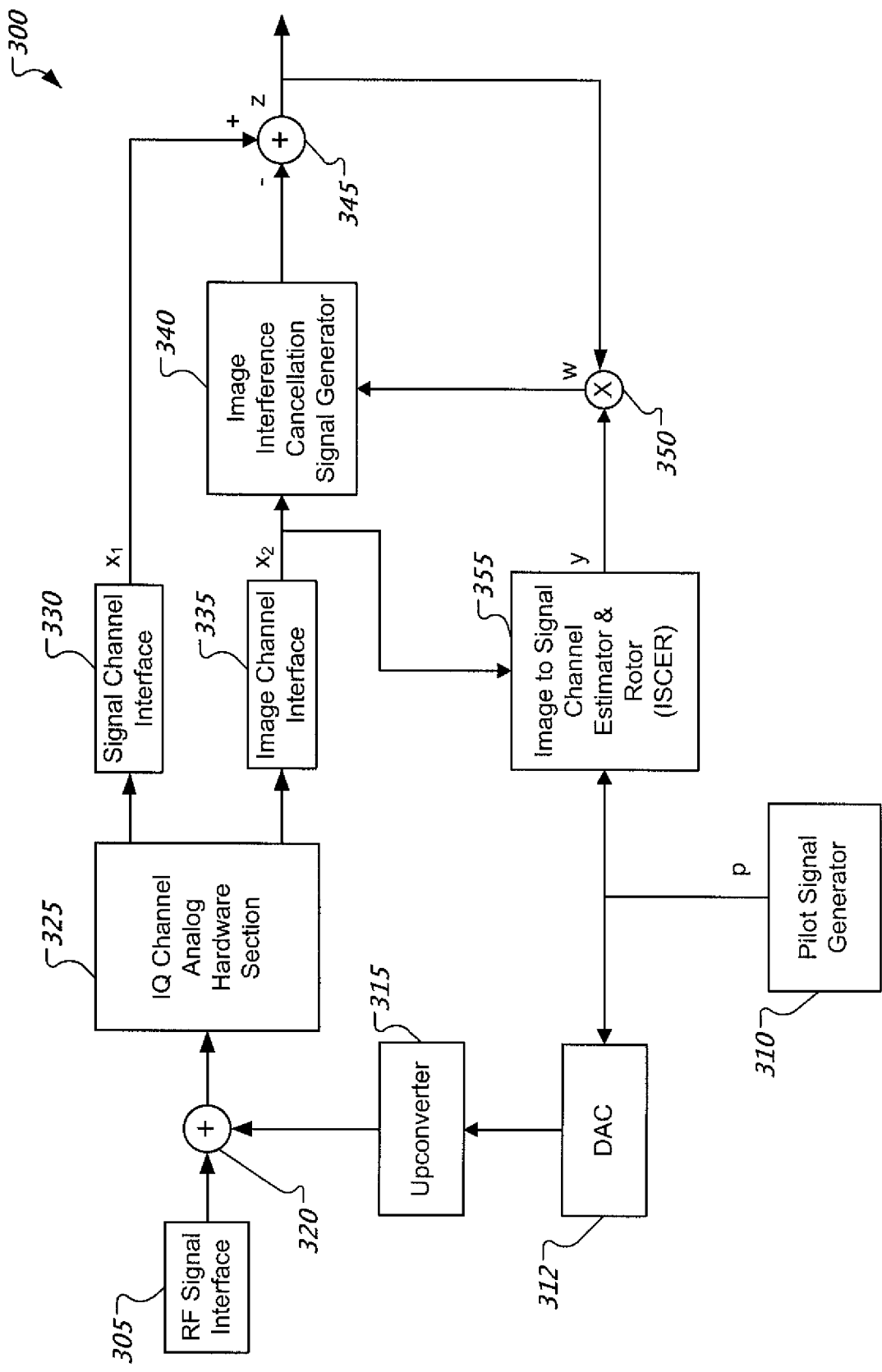
FIG. 3 shows another example of a wireless receiver system configured to perform image cancellation.

FIG. 3 shows another example of a wireless receiver system 300 configured to perform image cancellation. The system includes an RF signal interface 305, pilot signal generator 310, DAC 312, upconverter 315, adder 320, IQ channel analog hardware section 325, signal channel interface 330, image channel interface 335, image interference cancellation signal generator 340, adder 345, multiplier 350, and image to signal channel estimator & rotor (ISCER) 355.

The IQ channel analog hardware section 325 includes analog components such as an analog mixer, analog front end (AFE), quadrature downconverter, LPFs, and ADCs. The IQ channel analog hardware section 325 receives a version of the RF signal from the RF signal interface 305 that has been modified by the adder 320. The IQ channel analog hardware section 325 performs a low IF down conversion which includes downconverting the modified RF signal to form in-phase and quadrature signals, which include a desired band signal an image band signal. Due to an IQ imbalance of the in-phase channel and quadrature channel signals within the IQ channel analog hardware section 325, the interference from the image band signal, which can be referred to as a leakage signal, can leak in to the desired band signal and can degrade the SNR. In receiver image cancellation, a DSP algorithm can be applied to determine the leakage signal and subtract the leakage signal from the desired band signal such that image interference is removed from the desired band signal.

A pilot signal generator 310 can generate a pilot signal p that is uncorrelated to the desired signal and the image interference. In some implementations, the pilot signal p is based on a random sequence. The DAC 312 converts the pilot signal p into an analog signal, which is upconverted by the upconverter 315. The adder 320 combines the upconverted version with the RF signal from the RF signal interface 305.

The ADC output of the IQ channel analog hardware section 325 can include a complex low IF signal that has in-phase and quadrature signals that cover the desired channel and the image channel. The signal channel interface 330 and the image channel interface 335 can downconvert the ADC output into baseband signals, including the desired channel signal $x_1$ and image channel signal $x_2$.

Based on the pilot signal p and the image channel signal $x_2$, the ISCER 355 can determine a pilot training signal y that mirrors a leakage signal being introduced by the IQ imbalanced channel of the low IF downconversion process within the IQ channel analog hardware section 325. The pilot training signal y can be a weighted version of the pilot signal. The weights used by the ISCER 355 can be adapted based on the pilot signal p and an error signal that is based on the difference between the real pilot signal in the image channel output and the pilot training signal y.

The system 300 uses the pilot training signal y to train an adaptation filter included in the image interference cancellation signal generator 340. Multiplier 350 multiplies the pilot training signal y and an output signal z to produce weights w for the adaptive filter of the generator 340. In some implementations, the system 300 causes a DSP to perform a vector multiply operation on a pilot training signal vector and a weight vector. The adder 345 produces the output signal z based on an output of the signal channel interface 330 and a negative version of an output of the image interference cancellation signal generator 340.

The output signal z of the receiver system 300 can be thought of as an image cancellation error of a leakage replica of the pilot signal from the image channel to the signal channel and the real pilot signal leakage in the signal channel. The error of the image cancellation is generated by the subtraction of desired channel output $x_1$ and the output of the adapted image cancellation filter (e.g., output from generator 340). This error signal is also the desired signal with the image interference cancelled out. An advantage of an architecture of system 300 is that there is no frequency response shaping to the desired signal. Another advantage of the architecture of system 300 is that the total image leakage is minimized in the whole desired channel because a filter such as a multi-tap adaptive filter can be applied to the image channel output.

Figure 4:
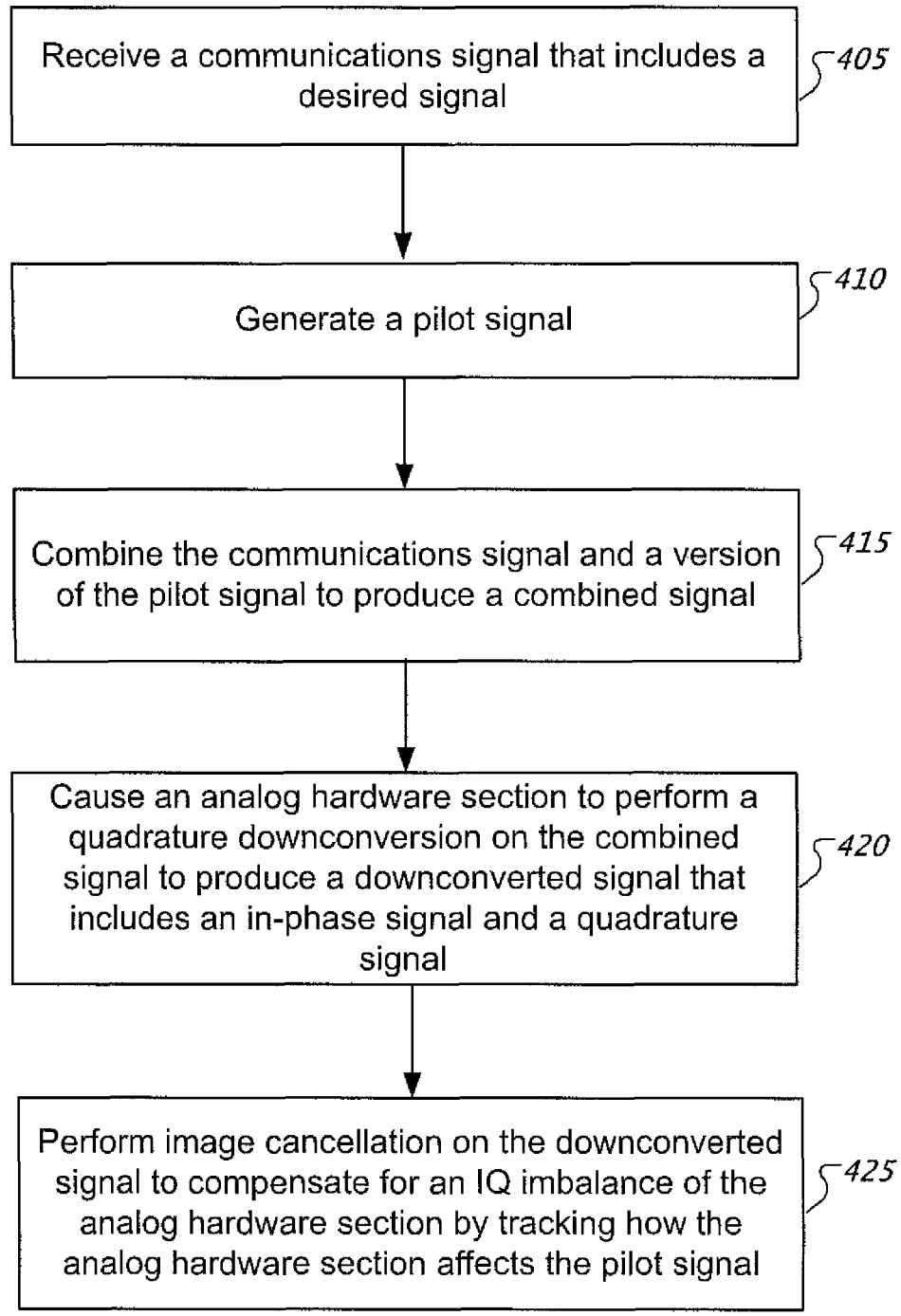
FIG. 4 shows an example of a communication process of a receiver system.

FIG. 4 shows an example of a communication process of a receiver system. At 405, the process receives a communications signal that includes a desired signal. Receiving a communications signal can include receiving a version of an RF signal that has been filtered by a band pass filter. The communications signal can include one or more digital television signals. At 410, the process generates a pilot signal. Generating a pilot signal can include using a signal that is uncorrelated with the communications signal. For example, a random signal can be used to produce the pilot signal. In some implementations, the process can cause a DSP to generate the random signal via a pseudorandom number generator. At 415, the process combines the communications signal and a version of the pilot signal to produce a combined signal. Combining the communications signal and a version of the pilot signal can include adding the signals. In some implementations, the version of the pilot signal is an upconverted analog signal that is based on a pilot signal generated by a DSP. In some implementations, a DSP produces a pilot signal that is within a frequency band of the desired signal, which does not require upconversion. In some implementations, a version of the pilot signal is an analog version of a digital upconverted pilot signal.

At 420, the process causes an analog hardware section to perform a quadrature downconversion on the combined signal to produce a downconverted signal that includes an in-phase signal and a quadrature signal. The analog hardware section can include demodulators, oscillators, and ADCs for producing a digital version of the downconverted signal. The downconverted signal can be considered a complex signal that has real and imaginary signals. A DSP can include separate input interfaces for receiving the digital version of the in-phase signal and the quadrature signal. Causing an analog hardware section to perform a quadrature downconversion can include energizing the analog hardware section, providing one or more signals to the analog hardware section, or a combination thereof. At 425, the process performs image cancellation on the downconverted signal to compensate for an IQ imbalance of the analog hardware section by tracking how the analog hardware section affects the pilot signal. An example of an image cancellation process is described below in connection with FIG. 5.

Figure 5:
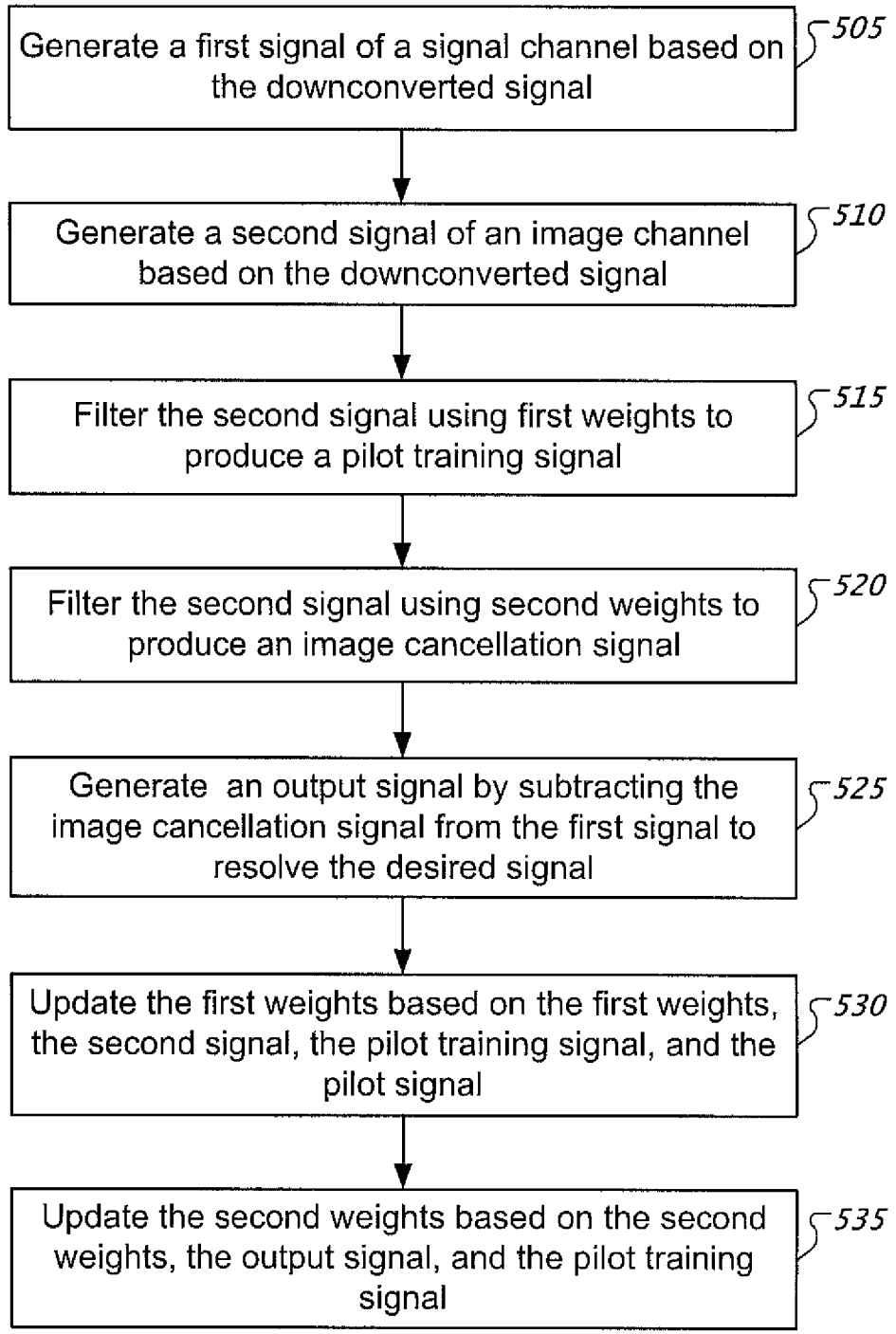
FIG. 5 shows an example of an image cancellation process used by the communication process of FIG. 4.

FIG. 5 shows an example of an image cancellation process used by the communication process of FIG. 4. A DSP can execute the image cancellation process. The process can cause a DSP to receive the downconverted signal. At 505, the image cancellation process generates a first signal of a signal channel based on the downconverted signal. Generating the first signal can include demodulating an in-phase signal of the downconverted signal into a first baseband signal. Generating the first signal can further include filtering the first baseband signal via a low pass filter. At 510, the process generates a second signal of an image channel based on the downconverted signal. Generating the second signal can include demodulating a quadrature signal of the downconverted signal into a second baseband signal. Generating the second signal can further include filtering the second baseband signal via a low pass filter.

At 515, the process filters the second signal using first weights to produce a pilot training signal. Filtering the second signal using the first weights can include providing a version of the first weights to a multi-tap FIR filter. During an initialization routine, the first weights can be set to a predetermined value such as one. The process can adaptively update the first weights based on how an IQ imbalance of the analog hardware section affects the pilot signal. In some implementations, the process can access the first weights via a memory structure. Different versions of the first weights can include previous, current, and/or future versions of a weight vector. The length of the weight vector can be based on the number of taps of a FIR filter used by the process at 515. The number of the taps used by the process can depend on one or more aspects of an analog hardware section. For example, if a mismatch between in-phase and quadrature channel does not vary with frequencies or the variation with frequency is small, one tap may be used. Otherwise, more than one tap may be required to compensate for the mismatch.

At 520, the process filters the second signal using second weights to produce an image cancellation signal. Filtering the second signal using the second weights can include providing a version of the second weights to a multi-tap FIR filter. The process can adaptively update the second weights based on the pilot training signal and how the IQ imbalance of the analog hardware section causes leakage between the signal channel and the image channel. In some implementations, the process can access the second weights via a memory structure. Second weights can include previous, current, and/or future versions of the weights. Different versions of the second weights can include previous, current, and/or future versions of a weight vector. The length of the weight vector can be based on the number of taps of a FIR filter used by the process at 520.

At 525, the process generates an output signal by subtracting the image cancellation signal from the first signal to resolve the desired signal. Generating the output signal can include causing a DSP to perform a subtraction operation.

At 530, the process updates the first weights based on the first weights, the second signal, the pilot training signal, and the pilot signal. Updating the first weights can include determining future weight values from current weight values and an error vector. The process can use an LMS technique to compute the error vector based on the second signal, the pilot training signal, and the pilot signal. For example, updating the first weights can include using a LMS technique to iteratively adapt the first weights such that the pilot training signal replicates a version of the pilot signal that is responsive to an IQ imbalance of the analog hardware.

At 535, the process updates the second weights based on the second weights, the output signal, and the pilot training signal. Updating the second weights can include determining future weight values from current weight values and an error vector. The process can use an LMS technique to compute the error vector based on a version of the output signal (generated at 525) and the pilot training signal. For example, updating the second weights can include using a LMS technique to iteratively adapt the second weights such that the image cancellation signal is responsive to the pilot training signal and the signal leakage between the signal channel and the image channel as caused by the IQ imbalance of the analog hardware.

A DSP based technique for low intermediate frequency image interference cancellation can include using a first adaptive FIR filter system to generate a replica of the pilot signal in the desired channel, which is generated by the IQ imbalanced channels in an analog hardware section; using a second adaptive FIR filter system to generate the response of the IQ imbalance effect from the image channel to the desired signal channel in a low intermediate frequency down conversion wireless receiver system; using separated image channel signal and desired signal channel outputs to adapt the filter coefficients; and generating the desired signal by subtracting the replica of the image interference in the desired channel from the desired signal channel output.

A system for low intermediate frequency DSP image cancellation can include a first adaptive FIR filter system to generate the replica of pilot training signal generated by the IQ imbalanced channel, a second adaptive FIR filter system to generate the replica of the image interference, a first adder in the analog domain to inject the pilot signal into a low intermediate frequency image channel in a wireless receiver system, a second adder in the digital domain to subtract the replica of the image interference, circuitry that processes a baseband image signal down-converted from the low intermediate frequency image channel and uses said signal to generate the replica of the image interference and adapt the image cancellation FIR filter coefficient, and circuitry that processes a baseband desired signal down-converted from the low intermediate frequency desired channel and uses said signal to generate the desired signal output with the image interference cancelled and adapt the image to a signal channel estimator and rotor output. A DSP of the system can include circuitry configured to receive a downconverted signal, in a digital domain, that is responsive to a quadrature downconversion of a combined signal in an analog hardware section and circuitry configured to perform operations in the digital domain.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
   receiving a downconverted signal in a digital domain, the downconverted signal comprising an in-phase signal and a quadrature signal;
   generating a first signal of a signal channel based on the downconverted signal;
   generating a second signal of an image channel based on the downconverted signal;
   filtering the second signal using first weights to produce a pilot training signal;
   filtering the second signal using second weights to produce an image cancellation signal;
   generating an output signal by subtracting the image cancellation signal from the first signal to resolve a desired signal;
   updating the first weights based on the first weights, the second signal, the pilot training signal, and a pilot signal; and
   updating the second weights based on the second weights, the output signal, and the pilot training signal.

2. The method of claim 1, comprising:
   receiving a communications signal comprising the desired signal;
   generating the pilot signal; and
   combining the communications signal and a version of the pilot signal to produce a combined signal.

3. The method of claim 2, wherein the downconverted signal is generated by causing an analog hardware section to perform a quadrature downconversion on the combined signal.

4. The method of claim 3, wherein updating the first weights comprises using a least-mean-squares technique to iteratively adapt the first weights such that the pilot training signal replicates a version of the pilot signal that is responsive to an IQ imbalance of the analog hardware section.

5. The method of claim 4, wherein updating the second weights comprises using a least-mean-squares technique to iteratively adapt the second weights such that the image cancellation signal is responsive to the pilot training signal and signal leakage between the signal channel and the image channel as caused by the IQ imbalance.

6. The method of claim 2, wherein generating the pilot signal comprises using a random signal to produce the pilot signal.

7. The method of claim 1, wherein filtering the second signal using the first weights comprises providing a version of the first weights to a multi-tap finite impulse response filter.

8. The method of claim 1, wherein filtering the second signal using the second weights comprises providing a version of the second weights to a multi-tap finite impulse response filter.

9. An apparatus, comprising:
circuitry configured to receive a downconverted signal in a digital domain, the downconverted signal comprising an in-phase signal and a quadrature signal; and
circuitry configured to perform operations in the digital domain, the operations comprising
generating a first signal of a signal channel based on the downconverted signal,
generating a second signal of an image channel based on the downconverted signal,
filtering the second signal using first weights to produce a pilot training signal,
filtering the second signal using second weights to produce an image cancellation signal,
generating an output signal by subtracting the image cancellation signal from the first signal to resolve a desired signal,
updating the first weights based on the first weights, the second signal, the pilot training signal, and a pilot signal, and
updating the second weights based on the second weights, the output signal, and the pilot training signal.

10. The apparatus of claim 9, wherein the downconverted signal is responsive to a quadrature downconversion of a combined signal in an analog hardware section, wherein the combined signal is based on a communications signal and a version of the pilot signal, and wherein the operations comprise generating the pilot signal.

11. The apparatus of claim 10, wherein updating the first weights comprises using a least-mean-squares technique to iteratively adapt the first weights such that the pilot training signal replicates a version of the pilot signal that is responsive to an IQ imbalance of the analog hardware section.

12. The apparatus of claim 11, wherein updating the second weights comprises using a least-mean-squares technique to iteratively adapt the second weights such that the image cancellation signal is responsive to the pilot training signal and signal leakage between the signal channel and the image channel as caused by the IQ imbalance.

13. The apparatus of claim 9, wherein filtering the second signal using the first weights comprises providing a version of the first weights to a multi-tap finite impulse response filter.

14. The apparatus of claim 9, wherein filtering the second signal using the second weights comprises providing a version of the second weights to a multi-tap finite impulse response filter.

15. A system, comprising:
a radio frequency interface configured to receive a communications signal comprising a desired signal;
a combiner configured to add the communications signal and a version of a pilot signal to produce a combined signal;
an analog hardware section configured to perform a quadrature downconversion on the combined signal to produce a downconverted signal in a digital domain, the downconverted signal comprising an in-phase signal and a quadrature signal;
a memory structure configured to store data comprising first weights and second weights; and
a processor, communicatively coupled with the combiner, the analog hardware section, and the memory structure, the processor configured to perform operations comprising
generating the pilot signal,
generating a first signal of a signal channel based on the downconverted signal,
generating a second signal of an image channel based on the downconverted signal,
filtering the second signal using the first weights to produce a pilot training signal,
filtering the second signal using the second weights to produce an image cancellation signal,
generating an output signal by subtracting the image cancellation signal from the first signal to resolve the desired signal,
updating the first weights based on the first weights, the second signal, the pilot training signal, and the pilot signal, and
updating the second weights based on the second weights, the output signal, and the pilot training signal.

16. The system of claim 15, wherein updating the first weights comprises using a least-mean-squares technique to iteratively adapt the first weights such that the pilot training signal replicates a version of the pilot signal that is responsive to an IQ imbalance of the analog hardware section.

17. The system of claim 16, wherein updating the second weights comprises using a least-mean-squares technique to iteratively adapt the second weights such that the image cancellation signal is responsive to the pilot training signal and signal leakage between the signal channel and the image channel as caused by the IQ imbalance.

18. The system of claim 15, wherein filtering the second signal using the first weights comprises providing a version of the first weights to a multi-tap finite impulse response filter.

19. The system of claim 15, wherein filtering the second signal using the second weights comprises providing a version of the second weights to a multi-tap finite impulse response filter.

20. The system of claim 15, wherein generating the pilot signal comprises using a random signal to produce the pilot signal.

21. The system of claim 15, wherein the communications signal comprises one or more digital television signals.

22. The system of claim 15, further comprising: an upconverter to generate the version of the pilot signal by upconverting an analog version of the pilot signal into a frequency band of the desired signal.

* * * * *